United States Patent
Furness et al.

(10) Patent No.: US 10,951,256 B1
(45) Date of Patent: Mar. 16, 2021

(54) ROTARY SWITCH FOR A MULTI-CHANNEL COMMUNICATION DEVICE

(71) Applicant: Harris Global Communications, Inc., Rochester, NY (US)

(72) Inventors: Richard Furness, Kent, NY (US); Cory Fitzsimmons, Avon, NY (US); Daniel Harris, Rochester, NY (US); Timothy Giles, Brockport, NY (US)

(73) Assignee: HARRIS GLOBAL COMMUNICATIONS, INC, Rochester, NY (US)

( * ) Notice: Subject to any disclaimer, the term of this patent is extended or adjusted under 35 U.S.C. 154(b) by 0 days.

(21) Appl. No.: 16/870,631

(22) Filed: May 8, 2020

(51) Int. Cl.
*H04B 1/401* (2015.01)
*H04B 1/3827* (2015.01)

(52) U.S. Cl.
CPC ........... *H04B 1/401* (2013.01); *H04B 1/3833* (2013.01)

(58) Field of Classification Search
CPC ...... H04B 1/401; H04B 1/3833; H01H 19/00; H01H 19/14
See application file for complete search history.

(56) References Cited

U.S. PATENT DOCUMENTS

| | | | |
|---|---|---|---|
| 3,703,613 A | 11/1972 | Abel | |
| 3,767,112 A * | 10/1973 | Tonari | H03J 1/066 334/1 |
| 5,513,268 A | 4/1996 | Bironas et al. | |
| 5,627,531 A * | 5/1997 | Posso | G06F 3/0362 341/22 |
| 6,178,916 B1 * | 1/2001 | Snider | G01D 13/00 116/284 |
| 8,797,153 B2 | 8/2014 | Vanhelle et al. | |
| 2015/0159747 A1 | 6/2015 | Hoskins et al. | |
| 2017/0101130 A1 | 4/2017 | Lavoie | |

FOREIGN PATENT DOCUMENTS

EP   1884857 A1   2/2008

\* cited by examiner

*Primary Examiner* — Nguyen T Vo
(74) *Attorney, Agent, or Firm* — Fox Rothschild LLP; Robert J. Sacco; Carol E. Thorstad-Forsyth (57) ABSTRACT

Systems (100) and methods (500) for controlling operations of an electronic device. The methods comprise: using a rotary knob having a single rotatable part to select a first circuit to perform operations of the electronic device during a first time and to select a second circuit to perform operations of the electronic device during a second time; and using the single rotatable part of the rotary knob to additionally change preset functions for the first circuit at the first time and a second circuit at the second time, where a degree of rotation of the single rotatable part corresponds to a desired preset function input selected from a plurality of possible preset function inputs.

20 Claims, 5 Drawing Sheets

ROTARY SWITCH FOR A MULTI-CHANNEL COMMUNICATION DEVICE

BACKGROUND

Statement of the Technical Field

The present document generally relates to communication systems. More particularly, the present solution relates to a rotary switch for a multi-channel communication device.

DESCRIPTION OF THE RELATED ART

There are various communication networks known in the art. Such communication networks include a tactical network, a Land Mobile Radio (LMR) network, a Wideband Code Division Multiple Access (WCDMA) based network, a Code Division Multiple Access (CDMA) based network, a Wireless Local Area Network (WLAN), an Enhanced Data rates for GSM Evolution (EDGE) based network and a Long Term Evolution (LTE) based network. Each of these communication networks comprises a plurality of communication devices and network equipment configured to facilitate communications between the communication devices.

Some conventional communication devices include two radio transceivers. A user of such a conventional communication device is able to change the volume for each radio transceiver and change the preset function for each radio transceiver. By changing the preset function, one or more operating parameters for a respective radio transceiver is modified. The operating parameters include, but are not limited to, a frequency, a mode, and/or a waveform.

In some scenarios, the communication device includes two knobs for each radio transceiver, namely a first knob to change volume and a second knob to change the preset function. In other scenarios, the communication device includes a stacked knob for each radio transceiver. Each stacked knob comprises two independent rotary switches for a respective radio transceiver. A first rotary switch controls the volume, and a second rotary switch controls the preset function. Both of these solutions are hardware intensive and costly, as well as takes up an undesirable amount of space on the communication device.

SUMMARY

The present document relates to implementing systems and methods for controlling operations of an electronic device (e.g., a communication device). The methods comprise: using a rotary knob having a single rotatable part to select a first circuit (e.g., a first radio transceiver) to perform operations of the electronic device during a first time period and to select a second circuit (e.g., a second radio transceiver) to perform operations of the electronic device during a second time period; and using the single rotatable part of the rotary knob to additionally change preset functions for the first circuit during the first time and the second circuit during the second time, where a degree of rotation of the single rotatable part corresponds to a desired preset function input selected from a plurality of possible preset function inputs.

In some scenarios, the first circuit is selected by: placing the single rotatable part of the rotary knob in a first home position; and maintaining the single rotatable part in the first home position for a given amount of time so as to cause the electronic device to switch operations from a second circuit to the first circuit. The second circuit is selected by: placing the single rotatable part of the rotary knob in a second home position; and maintaining the single rotatable part of the rotary knob in the second home position for the given amount of time so as to cause the electronic device to switch operations from the first circuit to the second circuit. The preset functions of each circuit are changed by rotating the rotatable part of the rotary knob in a given direction (e.g., the clockwise direction or counterclockwise direction) until the rotatable part reaches a respective preset function input position of a plurality of preset function input positions. The preset functions for the first and second circuits can each be defined by at least one of a communications mode, a frequency, and a waveform type.

In those or other scenarios, the methods also comprise: controlling a volume setting for the first circuit using a same volume control element as that used for controlling a volume setting for the second circuit; providing a tactile feedback output each time the single rotatable part of the rotary knob is placed in a particular input position of a plurality of input positions; and/or providing visual indications on the rotary knob for indicating locations of a plurality of input positions for the single rotatable part. The tactile feedback output may have a different vibrating pulse duration, a different number of vibrating pulses, or a different vibrating pulse sequence as compared to that of at least other tactile feedback output associated with the rotary knob.

BRIEF DESCRIPTION OF THE DRAWINGS

The present solution will be described with reference to the following drawing figures, in which like numerals represent like items throughout the figures.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present solution generally concerns a novel rotary knob feature that can be used in a plurality of different applications. For example, the novel rotary knob feature can be employed in multi-channel communication devices to control preset functions of two radio transceivers, and/or in single channel communication devices to control talk groups and/or other operating parameters. The particulars of the novel rotary knob feature will become apparent as the discussion progresses.

Figure 1:
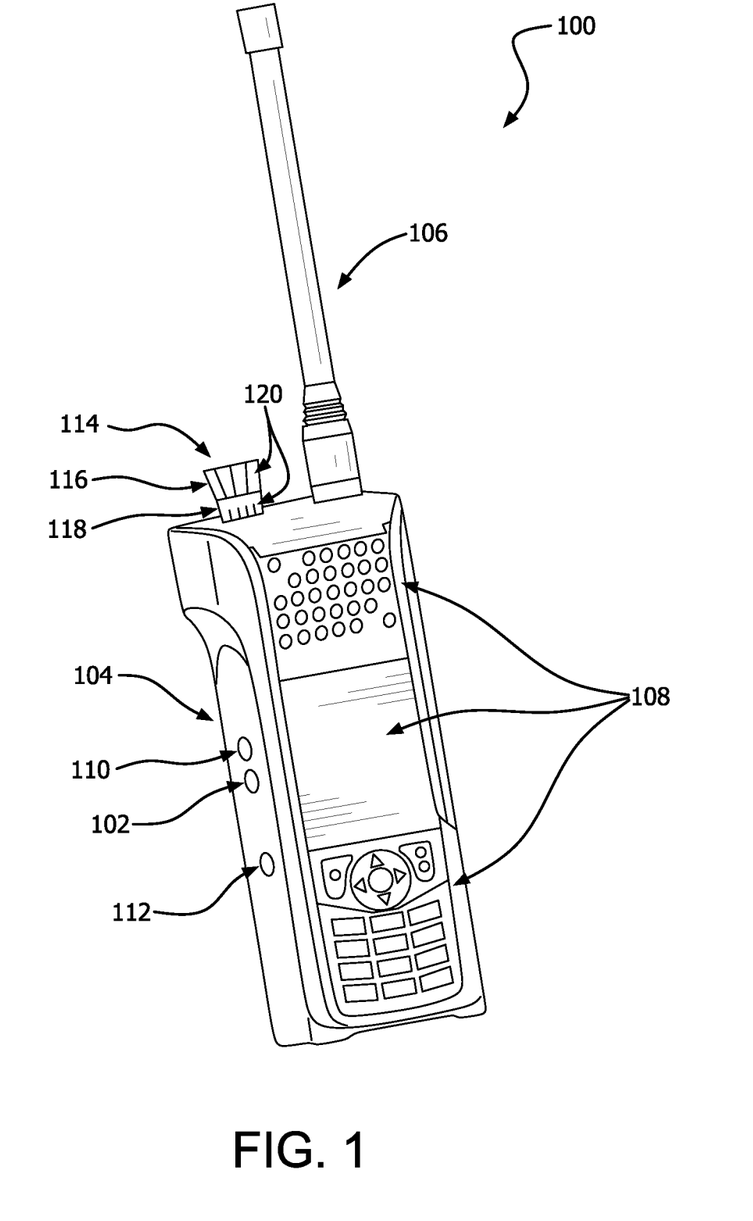
FIG. 1 provides an illustration of an illustrative communication device.

Referring now to FIG. 1, there is provided a block diagram of an illustrative communication device 100 that implements the present solution. Although the communication device 100 is shown in FIG. 1 to be a portable radio, the present solution is not limited in this regard. For example, the communication device 100 can alternatively include, but is not limited to, a phone, a vehicular communication device or other electronic device. The present solution may also be implemented on a wired remote input device.

In the scenario shown in FIG. 1, the communication device 100 generally includes a housing 104, at least one antenna 106 and internal circuitry (not shown in FIG. 1). The communication device 100 also includes control elements 102, 110, 112, 114 and other user interface components 108. The user interface components 108 can include, but are not limited to, a speaker, a display screen, and a keypad. The speaker volume is controlled via control elements 102, 110. For example, the speaker volume is increased by depressing control element 110, and is decreased by depressing control element 102.

The communication device 100 is generally configured to facilitate the provision of data communication services, individual call services or group call services to a service user. A data communication service is generally a service by which a service user is able to send and/or receive data messages. An individual call service is generally a service by which a service user is able to talk with one other service user. The group call service is a service by which a service user is able to talk to one or more service users associated with a particular talk group or social media profile. The group call service can be implemented by a PTT group call service. The PTT group call service is an instant service by which the PTT service user is able to immediately talk to other PTT service users of a particular talk group or social media profile by actuating a control element 112 of the communication device 100.

Notably, the communication device 100 is configured to operate in a Land Mobile Radio (LMR) based communication system, a Global Positioning System (GPS), a cellular based communication system and/or other wireless communication system. The communication device 100 can employ a single communication protocol or multiple communication protocols. For example, if the communication device 100 is a tactical radio or an LMR radio, then it can employ one or more of the following communication protocols: a tactical protocol; a Terrestrial Trunked Radio (TETRA) transport protocol; a P25 transport protocol; an OPENSKY® protocol; and/or an Enhanced Digital Access Communication System (EDACS) protocol. If the communication device 100 is a cellular phone, then it can employ one or more of the following communication protocols: a Wideband Code Division Multiple Access (WCDMA) based protocol; a Code Division Multiple Access (CDMA) based protocol; a Wireless Local Area Network (WLAN) based protocol; an Enhanced Data rates for GSM Evolution (EDGE) network based protocol; and a Long Term Evolution (LTE) network based protocol.

The present solution is not limited to the communication device design shown in FIG. 1. For example, another communication device design is provided in FIG. 3 which shows a remote control device for a radio. The remote control device has the rotary knob 114 in a position that is angled relative to the a multi-pin data/audio connector 300.

Figure 2:
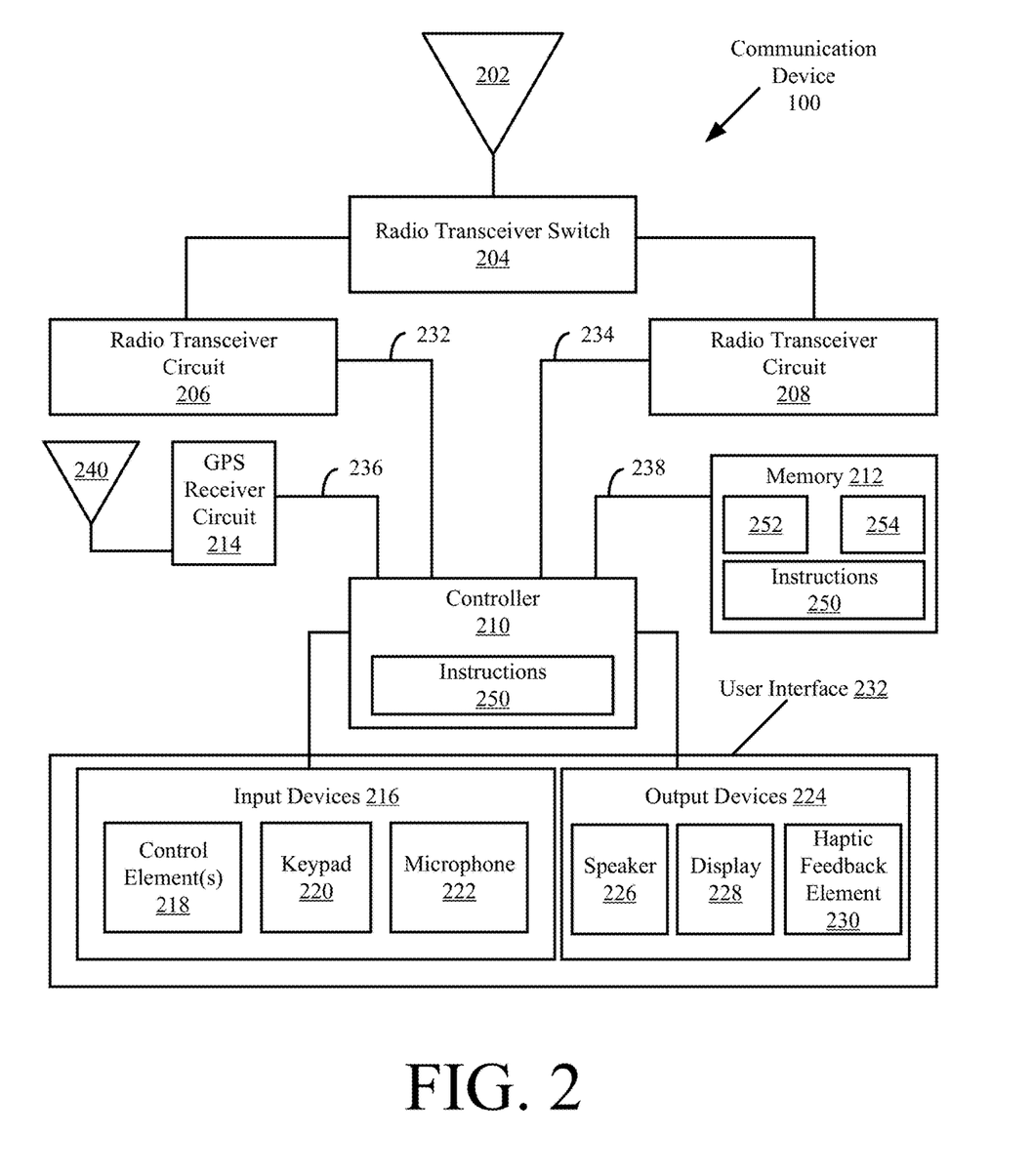
FIG. 2 provides an illustration of an illustrative hardware architecture for the communication device shown in FIG. 1.

A more detailed block diagram of the communication device 100 is provided in FIG. 2. Notably, the communication device 100 may include more or less components than those shown in FIG. 2. However, the components shown are sufficient to disclose an illustrative hardware architecture implementing the present solution. The hardware architecture of FIG. 2 represents one embodiment of a representative communication device configured to facilitate changes in volume for two radio transceivers 206, 208 and changes in preset functions for the two radio transceivers 206, 208. The preset functions are defined by one or more operating parameters. The operating parameters can include, but are not limited to, frequency, mode, and/or waveform. The frequency can include, but is not limited to, a satcom frequency, a Very High Frequency ("VHF"), an Ultra High Frequency ("UHF"). The mode can include, but is not limited to, a satellite communications mode, an ad-hoc network mode, a cellular network mode, and/or a P25 network mode. The waveform can include, but is not limited to, a MANET waveform, a satellite communications waveform, a VHF waveform, and/or a UHF waveform. The manner in which these changes are achieved will become more evident as the discussion progresses.

As shown in FIG. 2, the communication device 100 comprises an antenna 202 for receiving and transmitting Radio Frequency (RF) signals. A radio transceiver switch 204 selectively couples the antenna 106 to a first radio transceiver circuit 206 and a second radio transceiver circuit 208 in a manner familiar to those skilled in the art. The present solution is not limited in this regard. The communication device can alternatively comprise one or more antennas for each radio transceiver, and therefore may be absent of the radio transceiver switch 204 for selectively connecting the radio transceivers to a common antenna.

Radio transceiver circuits are well known in the art, and therefore will not be described in detail herein. Still, it should be understood that each radio transceiver circuit is configured to (i) cause information to be transmitted to a network via RF signals and (ii) process RF signals received from the network to extract information therefrom. The first and second radio transceiver circuits 206, 208 are coupled to a controller 210 via respective electrical connections 232, 234. In a transmit mode, the controller 210 also provides information to the radio transceiver circuits 206, 208 for encoding and modulating information into RF signals. The radio transceiver circuits 206, 208 communicate the RF signals to the antenna 202 for transmission to an external device (e.g., network equipment not shown in FIG. 2). In a receive mode, the transceiver circuits provide decoded RF signal information to the controller 210. The controller 210 uses the decoded RF signal information in accordance with the function(s) of the communication device 100.

An antenna 106 is coupled to GPS receiver circuit 214 for receiving GPS signals. The GPS receiver circuit 214 demodulates and decodes the GPS signals to extract GPS location information therefrom. The GPS location information indicates the location of the communication device 100. The GPS receiver circuit 214 provides the decoded GPS location information to the controller 210. As such, the GPS receiver circuit 214 is coupled to the controller 210 via an electrical connection 236. The controller 210 uses the decoded GPS location information in accordance with the function(s) of the communication device 100.

The controller 210 stores the decoded RF signal information and the decoded GPS location information in a memory 212 of the communication device 100. Accordingly, the memory 212 is connected to and accessible by the controller 210 through an electrical connection 232. The memory 212 may be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory.

As shown in FIG. 2, one or more sets of instructions 250 are stored in the memory 212. The instructions 250 can also reside, completely or at least partially, within the controller 210 during execution thereof by the communication device 100. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the communication device 100 and that cause the communication device 100 to perform one or more of the methodologies of the present disclosure.

The controller 210 is also connected to a user interface 232. The user interface 232 is comprised of the user interface components 108 of FIG. 1. More particularly, the user interface 232 comprises input devices 216, output devices 224, and software routines (not shown in FIG. 2) configured to allow a user to interact with and control software applications 252 installed on the computing device 100. Such input and output devices respectively include, but are not limited to, a display 228, a speaker 226, a keypad 220, a directional pad (not shown in FIG. 2), a directional knob (not shown in FIG. 2), and a microphone 222. The display 228 may be designed to accept touch screen inputs.

The input devices 216 also comprise control elements 218. The control elements 218 include, but are not limited to, a PTT switch or button 112, volume control buttons 102, 110, and a rotary knob 114. PTT switches/buttons and volume control buttons are well known in the art, and therefore will not be described herein. Any known PTT switch/button and volume control buttons can be used herein. The PTT switch/button facilitates the immediate ability to talk to PTT service users of a particular talk group or social media profile. The volume control buttons 102, 110 facilitate the adjustment of the speaker volume for outputting audio received by a selected radio transceiver circuit 206 or 208.

Notably, a single volume control means 102, 110 is provided for volume control even though the communication device has two radio transceivers 206, 208, i.e., volume is controlled for both radio transceivers using the same volume control means 102, 110 rather than different volume control means as is the case in conventional solutions. Software 252 of the communication device 100 is configured to cause volume settings for both radio transceiver circuits 206, 208 to be stored in memory 212 and to cause each stored volume setting to be recalled from memory 212 when a respective radio transceiver circuit 206 or 208 is selected.

The rotary knob 114 provides a single knob control solution for selecting a radio transceiver circuit from the two radio transceiver circuits 206, 208, and changing the preset functions for the radio transceiver circuits. In this regard, it should be understood that the rotary knob 114 comprises a single rotatable part 116 (shown in FIG. 1) that can be manually rotated in two opposing directions. The rotatable part 116 is shaped and sized to allow easy and comfortable grasping and turning thereof by a user of the rotary knob 114. The rotary knob 114 can include, but is not limited to, a pull-and-turn knob having a part number 26YY50243 which is available from Grayhill Inc. of Illinois. The rotary knob 114 comprises an internal rotary switch that encodes the rotatable part's input position (or degree of rotation) as a binary number on a set of discrete Input/Output (I/O) lines that are read by software 252 to determine which input has been actively selected by a user. The software 252 then causes the communication device 100 to operate in accordance with the actively selected input. For example, the software 252 causes the first receiver 206 to operate at a particular frequency that is defined by a preset function parameter value 254 stored in memory 212 so as to be associated with a respective rotary switch binary number. Rotary switches are well known in the art, and therefore will not be described here.

Figure 4:
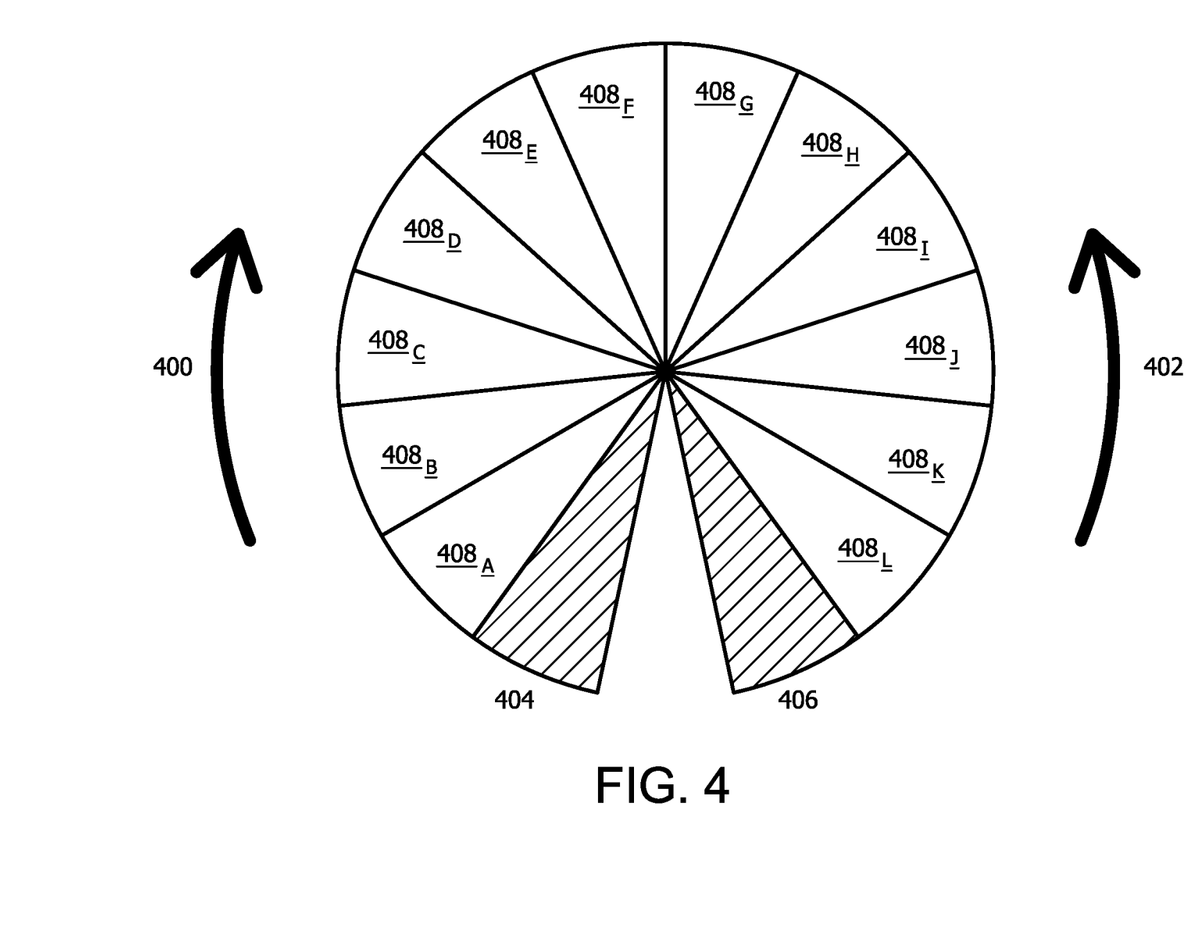
FIG. 4 provides an illustration that is useful for understanding operations of a rotary knob.

An illustration that is useful for understanding how the rotary knob feature of the communication device 100 operates is provided in FIG. 4. As shown in FIG. 4, the rotatable part 116 of the rotary knob 114 is rotatable in the clockwise direction 400 and the counterclockwise direction 402. The degree of rotation of the rotatable part 116 corresponds to a desired input selected from a plurality of possible inputs. The rotary knob 114 may comprise a plurality of internal detents to produce discrete input selections, as discussed below.

The first radio transceiver 206 is selected by (i) rotating the rotatable part 116 in the counterclockwise direction 402 until the rotatable part reaches a first home position 404, and (ii) causing the rotatable part 116 to remain in the first home position 404 for a given amount of time (e.g., ≥2 seconds). The second radio transceiver 208 is selected by (i) rotating the rotatable part 116 in the clockwise direction 400 until the rotatable part reaches a second home position 406, and (ii) causing the rotatable part 116 to remain in the second home position 406 for a given amount of time (e.g., ≥2 seconds). If the rotatable part 116 does not remain in a home position for the given amount of time, then the communication device 100 does not switch communication operations from one radio transceiver circuit to the other radio transceiver circuit (or stated differently, does not switch communication modes).

In the first and second home positions 404 and 406, an interior structural member (e.g., a protrusion) of the rotatable part 116 may abut a structural stop means (e.g., a protrusion) of a fixed part 118 (shown in FIG. 1) of the rotary knob 114. Additionally or alternatively, at least part of the interior structural member of the rotatable part 116 may slide into a given detent of a plurality of detents formed in the fixed part 118 when aligned therewith. The present solution is not limited in this regard.

Figure 3:
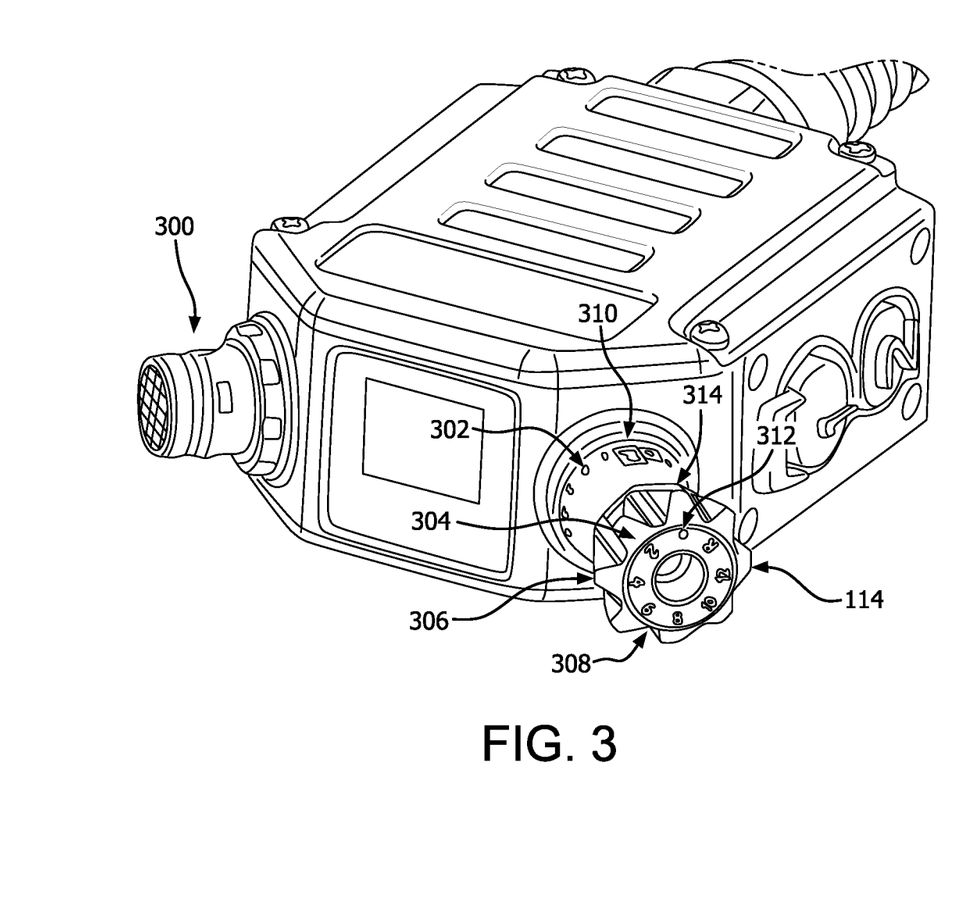
FIG. 3 provides an illustration of another illustrative communication device.

Markings or other indicators may be provided on the rotary knob parts 116, 118 for visually indicating to the user of the rotary knob 114 when the rotatable part 116 reaches its first and second home positions 404, 406. These markings can include printed lines (e.g., lines 120 of FIG. 1 or 302 of FIG. 3), and/or printed symbols (e.g., symbols 304 of FIG. 3). The other indicators can include, but are not limited to, protrusions (e.g., protrusions 306 of FIG. 3), cavities (not shown), indents (not shown), and/or notches (e.g., notches 308 of FIG. 3). In the scenario of FIG. 3, a visual indication may be provided that the rotatable part 116 has reached its first home position 404 (i) when a marking 310 of the fixed part becomes aligned with a marking 312 on the rotatable part and/or (ii) when the marking 310 of the fixed part becomes aligned with a protrusion 314 of the rotatable part. The present solution is not limited to the particulars of this scenario.

Once the first or second radio transceiver circuit 206, 208 has been selected, a preset function may be selected using the rotary knob 114. In this regard, it should be understood that the rotatable part 116 of the rotary knob 114 has a plurality of preset function input positions $408_A$, $408_B$, $408_C$, $408_D$, $408_E$, $408_F$, $408_G$, $408_H$, $408_I$, $408_J$, $408_K$, $408_L$, (collectively referred to as "preset function input positions 408"). Although twelve preset function input positions are shown in FIG. 4, the present solution is not limited in this regard. The rotary knob can have any number N of preset function input positions selected in accordance with a given application, where N is an integer equal to or greater than 1.

The preset function input positions 408 have different preset functions assigned thereto for each radio transceiver 206, 208. The following TABLE 1 illustrates this point.

TABLE 1

| Input Position | RT 206 Preset Function | RT 208 Preset Function |
| --- | --- | --- |
| $408_A$ | Preset Function 1 | Preset Function 12 |
| $408_B$ | Preset Function 2 | Preset Function 11 |
| $408_C$ | Preset Function 3 | Preset Function 10 |
| $408_D$ | Preset Function 4 | Preset Function 9 |
| $408_E$ | Preset Function 5 | Preset Function 8 |
| $408_F$ | Preset Function 6 | Preset Function 7 |
| $408_G$ | Preset Function 7 | Preset Function 6 |
| $408_H$ | Preset Function 8 | Preset Function 5 |
| $408_I$ | Preset Function 9 | Preset Function 4 |
| $408_J$ | Preset Function 10 | Preset Function 3 |
| $408_K$ | Preset Function 11 | Preset Function 2 |
| $408_L$ | Preset Function 12 | Preset Function 1 |

Each preset function for each radio transceiver 206, 208 may have one or more different operating parameters assigned thereto. The following TABLE 2 presents an illustrative scenario for the preset operating parameters.

TABLE 2

| | Frequency | Mode | Waveform |
| --- | --- | --- | --- |
| Radio Transceiver 206 | | | |
| Preset Function 1 | f1 | M1 | W1 |
| Preset Function 2 | f2 | M1 | W2 |
| Preset Function 3 | f3 | M1 | W2 |
| Preset Function 4 | f3 | M1 | W1 |
| Preset Function 5 | f3 | M2 | W3 |
| Preset Function 6 | f4 | M2 | W3 |
| Preset Function 7 | f5 | M2 | W3 |
| Preset Function 8 | f6 | M2 | W3 |
| Preset Function 9 | f7 | M3 | W4 |
| Preset Function 10 | f8 | M3 | W1 |
| Preset Function 11 | f9 | M4 | W2 |
| Preset Function 12 | f10 | M5 | W3 |
| Radio Transceiver 208 | | | |
| Preset Function 1 | f1 | M1 | W1 |
| Preset Function 2 | f2 | M1 | W1 |
| Preset Function 3 | f3 | M1 | W1 |
| Preset Function 4 | f4 | M1 | W1 |
| Preset Function 5 | f5 | M1 | W1 |
| Preset Function 6 | f6 | M1 | W1 |
| Preset Function 7 | f7 | M2 | W2 |
| Preset Function 8 | f8 | M2 | W2 |
| Preset Function 9 | f9 | M2 | W2 |
| Preset Function 10 | f10 | M2 | W2 |
| Preset Function 11 | f11 | M2 | W2 |
| Preset Function 12 | f12 | M2 | W2 |

In each preset function position 408, an interior protrusion (not shown) of the rotatable part 116 may reside in a respective detent (not shown) formed in the fixed part 118. The present solution is not limited in this regard. Other techniques for indexing preset function positions can be used here.

Markings or other indicators may be provided on the rotary knob parts 116, 118 for visually indicating to the user of the rotary knob 114 when the rotatable part 116 reaches a given preset function input position. These markings can include printed lines (e.g., lines 120 of FIG. 1 or 302 of FIG. 3), and/or printed symbols (e.g., symbols 304 of FIG. 3). The other indicators can include, but are not limited to, protrusions (e.g., protrusions 306 of FIG. 3), cavities (not shown), indents (not shown), and/or notches (e.g., notches 308 of FIG. 3). In some scenarios, a visual indication may be provided that the rotatable part 116 has reached a given preset function input position (i) when a respective marking of a plurality of markings 302 formed on the fixed part becomes aligned with a marking 312 formed on the rotatable part and/or (ii) when the respective marking of a plurality of markings 302 formed on the fixed part becomes aligned with the protrusion 314 of the rotatable part. The present solution is not limited to the particulars of this scenario.

As noted above, the first or second radio transceiver 206 is selected by (i) rotating the rotatable part 116 in a given direction 400, 402 until the rotatable part reaches a home position 404, 406 and (ii) causing the rotatable part 116 to remain in the home position 404, 406 for a given amount of time (e.g., ≥2 seconds). If the rotatable part 116 does not remain in a home position for the given amount of time, then the communication device 100 does not switch communication operations from one radio transceiver circuit to the other radio transceiver circuit. Accordingly, the user is able to count backwards from the last preset function input position to the first preset function input position when a radio transceiver switch is not triggered.

Referring again to FIG. 2, the communication device 100 further comprises a haptic feedback element 230. The haptic feedback element 230 can include, but is not limited to, a vibration generator and/or a haptic motor. Vibration generators and haptic motors are well known in the art, and therefore will not be described here. The haptic feedback element 230 is configured to provide users with tactile notifications of what radio transceiver circuit and/or preset function has been actively selected via the rotary knob 114. In this regard, the haptic feedback element 230 may generate different pulsed vibration outputs for the rotary knob positions 404, 406, $408_{A-L}$. The pulsed vibration outputs may have different vibrating pulse durations, different numbers of vibrating pulses, and/or different vibrating pulse sequences. The tactile output of the haptic feedback element 230 may be felt throughout the entire communication device 100 or only through the rotary knob 114.

For example, in some scenarios, the haptic feedback element 230 generates:
 a single long vibration pulse (having a first duration) when the rotatable part 116 of the rotary knob 114 remains in the first home position 404 for a given amount of time (e.g., ≥2 seconds) so as to indicate that the first radio transceiver 206 has been actively selected;
 two long vibration pulses (having the first duration) when the rotatable part 116 of the rotary knob 114 remains in the second home position 406 for a given amount of time (e.g., ≥2 seconds) so as to indicate that the second radio transceiver 208 has been actively selected;

a single short vibration pulse when the rotatable part 116 of the rotary knob 114 is in the selected radio transceiver's first preset function position (e.g., preset function position $408_A$ when the first radio transceiver 206 is selected or preset function position $408_L$ when the second radio transceiver 208 is selected);

two short vibration pulses when the rotatable part 116 of the rotary knob 114 is in the selected radio transceiver's second preset function position (e.g., preset function position $408_B$ when the first radio transceiver 206 is selected or preset function position $408_K$ when the second radio transceiver 208 is selected);

three short vibration pulses when the rotatable part 116 of the rotary knob 114 is in the selected radio transceiver's third preset function position (e.g., preset function position $408_C$ when the first radio transceiver 206 is selected or preset function position $408_J$ when the second radio transceiver 208 is selected);

four short vibration pulses when the rotatable part 116 of the rotary knob 114 is in the selected radio transceiver's fourth preset function position (e.g., preset function position $408_B$ when the first radio transceiver 206 is selected or preset function position $408_I$ when the second radio transceiver 208 is selected);

a single long vibration pulse (having a second duration) when the rotatable part 116 of the rotary knob 114 is in the selected radio transceiver's fifth preset function position (e.g., preset function position $408_E$ when the first radio transceiver 206 is selected or preset function position $408_H$ when the second radio transceiver 208 is selected);

a single long vibration pulse (having the second duration) and a single short vibration pulse when the rotatable part 116 of the rotary knob 114 is in the selected radio transceiver's sixth preset function position (e.g., preset function position $408_F$ when the first radio transceiver 206 is selected or preset function position $408_G$ when the second radio transceiver 208 is selected); . . . .

two long vibration pulses (having the second duration) when the rotatable part 116 of the rotary knob 114 is in the selected radio transceiver's tenth preset function position (e.g., preset function position $408_J$ when the first radio transceiver 206 is selected or preset function position $408_C$ when the second radio transceiver 208 is selected);

two long vibration pulses (having the second duration) and one short vibration pulse when the rotatable part 116 of the rotary knob 114 is in the selected radio transceiver's eleventh preset function position (e.g., preset function position $408_K$ when the first radio transceiver 206 is selected or preset function position $408_B$ when the second radio transceiver 208 is selected);

two long vibration pulses (having the second duration) and two short vibration pulses when the rotatable part 116 of the rotary knob 114 is in the selected radio transceiver's twelfth preset function position (e.g., preset function position $408_L$ when the first radio transceiver 206 is selected or preset function position $408_A$ when the second radio transceiver 208 is selected); and a long vibration (having the third duration) each time a selected setting has been successfully implemented by the communication device 100.

The present solution is not limited to the particulars of this example.

Figure 5:
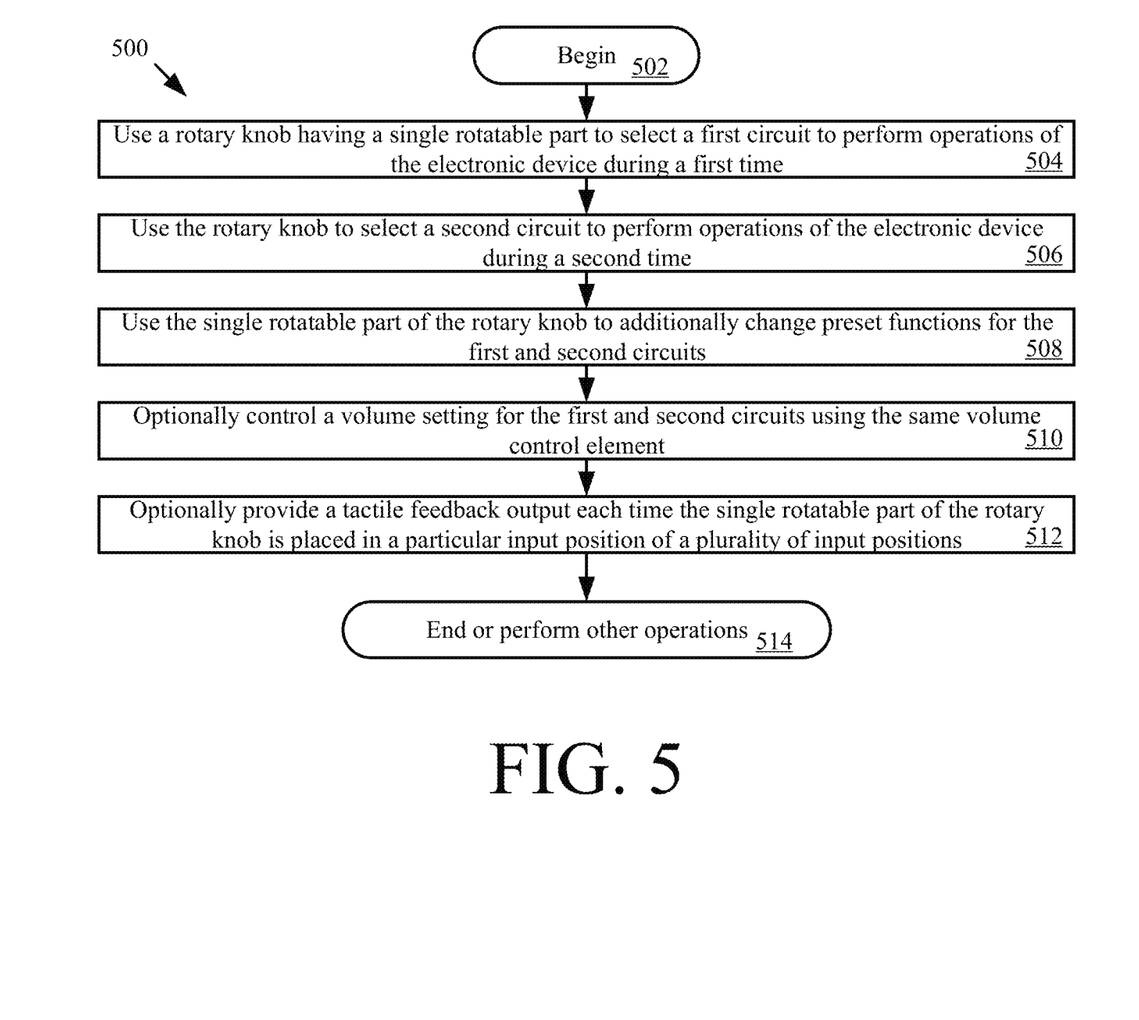
FIG. 5 provides a flow diagram of an illustrative method for operating an electronic device.

Referring now to FIG. 5, there is provided a flow diagram of an illustrative method 500 for operating an electronic device (e.g., communication device 100 of FIG. 1). Method 500 is shown as comprising a plurality of operations 502-514. The present solution is not limited to the particular order of the operations shown in FIG. 5. In some scenarios, at least operations 504-512 can be performed in a different order than that shown in FIG. 5.

Method 500 begins with 502 and continues with 504 where a rotary knob (e.g., rotary knob 114 of FIG. 1) is used to select a first circuit (e.g., radio transceiver circuit 206 of FIG. 2) to perform operations of the electronic device during a first time. Notably, the rotary knob has a single rotatable part (e.g., rotatable part 116 of FIG. 1). The first circuit is selected by: placing the single rotatable part of the rotary knob in a first home position; and maintaining the single rotatable part in the first home position for a given amount of time so as to cause the electronic device to switch operations from a second circuit to the first circuit.

In 506, the rotary knob is used to select a second circuit (e.g., radio transceiver 208 of FIG. 2) to perform operations of the electronic device during a second time. The second circuit is selected by: placing the single rotatable part of the rotary knob in a second home position; and maintaining the single rotatable part of the rotary knob in the second home position for the given amount of time so as to cause the electronic device to switch operations from the first circuit to the second circuit.

In 508, the single rotatable part of the rotary knob is used to additionally change preset functions for the first and second circuits. The preset functions for the first and second circuits may each be defined by a communications mode, a frequency, and/or a waveform type. A degree of rotation of the single rotatable part corresponds to a desired preset function input selected from a plurality of possible preset function inputs. The preset functions of each first and second circuit are changed by rotating the rotatable part of the rotary knob in a given direction until the rotatable part reaches a respective preset function input position of a plurality of preset function input positions (e.g., input positions $408_A$, . . . , $408_L$ of FIG. 4).

In 510, a volume setting for the first and second circuits is optionally controlled using the same volume control element (e.g., buttons 102, 110 of FIG. 1). A tactile feedback output is optionally provided each time the single rotatable part of the rotary knob is placed in a particular input position of a plurality of input positions, as shown by 512. The tactile feedback output may have a different vibrating pulse duration, a different number of sequential vibrating pulses, or a different vibrating pulse sequences than that of at least other tactile feedback output associated with the rotary knob. Subsequently, 514 is performed where method 500 ends or other operations are performed.

As evident from the above discussion, the present invention provides communication devices with certain advantages over conventional communication devices. For example, a plurality of actions or functions of a communication device can be selected or controlled using the single control element of the present invention. In effect, a user only needs one hand to hold the communication device and change functional settings thereof through the single control element of the present invention. The control elements of the present invention advantageously facilitate the decrease in overall sizes of communication devices. The relatively small sized communication devices of the present invention are less expensive to manufacture as compared to conventional communication devices including a plurality of rotary knobs and buttons for controlling functions thereof.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for controlling operations of an electronic device, comprising:
    using a rotary knob having a single rotatable part to select a first circuit to perform operations of the electronic device during a first time and to select a second circuit to perform operations of the electronic device during a second time; and
    using the single rotatable part of the rotary knob to additionally change preset functions for the first circuit during the first time and the second circuit during the second time, where a degree of rotation of the single rotatable part corresponds to a desired preset function input selected from a plurality of possible preset function inputs.

2. The method according to claim 1, wherein the electronic device is a communication device, the first circuit is a first radio transceiver circuit, and the second circuit is a second radio transceiver circuit.

3. The method according to claim 1, wherein the first circuit is selected by:
    placing the single rotatable part of the rotary knob in a first home position; and
    maintaining the single rotatable part in the first home position for a given amount of time so as to cause the electronic device to switch operations from a second circuit to the first circuit.

4. The method according to claim 3, wherein the second circuit is selected by:
    placing the single rotatable part of the rotary knob in a second home position; and
    maintaining the single rotatable part of the rotary knob in the second home position for the given amount of time so as to cause the electronic device to switch operations from the first circuit to the second circuit.

5. The method according to claim 1, wherein the preset functions of each said first and second circuit are changed by rotating the single rotatable part of the rotary knob in a given direction until the single rotatable part reaches a respective preset function input position of a plurality of preset function input positions.

6. The method according to claim 1, wherein the preset functions for the first and second circuits are each defined by at least one of a communications mode, a frequency, and a waveform type.

7. The method according to claim 1, further comprising controlling a volume setting for the first circuit using a same volume control element as that used for controlling a volume setting for the second circuit.

8. The method according to claim 1, further comprising providing a tactile feedback output each time the single rotatable part of the rotary knob is placed in a particular input position of a plurality of input positions.

9. The method according to claim 8, wherein the tactile feedback output has a different vibrating pulse duration, a different number of vibrating pulses, or a different vibrating pulse sequence than that of at least other tactile feedback output associated with the rotary knob.

10. The method according to claim 1, further comprising providing visual indications on the rotary knob for indicating locations of a plurality of input positions for the single rotatable part.

11. An electronic device, comprising:
    a first circuit configured to perform first operations of the electronic device;
    a second circuit configured to perform second operations of the electronic device; and
    a rotary knob having a single rotatable part that facilitates (i) a selection of the first circuit for performing the first operations during a first time, (ii) a selection of the second circuit for performing the second operations during a second time, and (ii) changes in preset functions for the first circuit during the first time and the second circuit during the second time, where a degree of rotation of the single rotatable part corresponds to a desired input selected from a plurality of possible inputs.

12. The electronic device according to claim 11, wherein the electronic device is a communication device, the first circuit is a first radio transceiver circuit, and the second circuit is a second radio transceiver circuit.

13. The electronic device according to claim 11, wherein the first circuit is selected when the single rotatable part of the rotary knob is placed in a first home position and remains in the first home position for a given amount of time.

14. The electronic device according to claim 13, wherein the second circuit is selected when the single rotatable part of the rotary knob is placed in a second home position and remains in the second home position for the given amount of time.

15. The electronic device according to claim 11, wherein the preset functions of each said first and second circuit are changed when the single rotatable part of the rotary knob is rotated into a respective preset function input position of a plurality of preset function input positions.

16. The electronic device according to claim 11, wherein the preset functions for the first and second circuits are each defined by at least one of a communications mode, a frequency, and a waveform type.

17. The electronic device according to claim 11, further comprising a volume control element that controls a volume setting for both the first and second circuits.

18. The electronic device according to claim 11, further comprising a haptic feedback element that provides a tactile feedback output each time the single rotatable part of the rotary knob is placed in a particular input position of a plurality of input positions.

19. The electronic device according to claim 18, wherein the tactile feedback output has a different vibrating pulse duration, a different number of vibrating pulses, or a different vibrating pulse sequence than that of at least other tactile feedback output associated with the rotary knob.

20. The electronic device according to claim 11, further comprising visual indicators provided on the rotary knob that indicate locations of a plurality of input positions for the single rotatable part.

* * * * *